INVENTORS
Yoshiyuki Nakai
Tetsuya Yokogawa

BY

ATTORNEY

United States Patent Office 3,548,510
Patented Dec. 22, 1970

3,548,510
METHOD AND APPARATUS FOR ODORLESSLY DRYING MATERIALS CONTAINING MALODOROUS COMPONENTS
Yoshiyuki Nakai and Tetsuya Yokogawa, Yokohama, Japan, assignors to Kanagawa Prefectural Government, an organ of the Japanese government
Filed Apr. 7, 1969, Ser. No. 814,046
Claims priority, application Japan, Apr. 6, 1968, 43/22,403
Int. Cl. B26b 7/00
U.S. Cl. 34—19
5 Claims

ABSTRACT OF THE DISCLOSURE

A method for odorlessly drying materials containing malodorous components which comprises feeding the materials into a heated rotating drying drum disposed in a heating chamber. Heated air is introduced into the drum to evaporate the malodorous components and water from said materials. The resulting deodorized and dried materials are conveyed to the outside by a plurality of plates provided on the inner wall of said drum. The gas containing the evaporated malodorous components is cooled. The water is removed and the resultant gas containing the malodorous components is burned and decomposed.

---

This invention relates to a method and apparatus for odorlessly drying materials containing malodorous components. More particularly, this invention relates to a method for odorlessly drying materials containing malodorous components which comprises heating said materials indirectly, mixing the evaporating malodorous components and water vapor with an oxygen-containing gas, cooling the resulting gaseous mixture to remove the water contained therein and thereafter burning up the mixture, and to an apparatus for carrying out said method.

The malodorous components in this invention are mainly those which are contained in the waste materials from leather factories, fertilizer factories, feedstuff factories or filth-treating places and which emit offensive odors when said materials are dried or burnt. Accordingly, the malodorous component, differing from an inorganic substance such as sulfurous acid gas, is essentially an organic substance, i.e. a compound of elements such as carbon, hydrogen, sulfur, oxygen, nitrogen and the like combined, and, emitting an offensive odor when the material in which it is contained is dried or brunt, stimulates the olfactory sense of human beings. The offensive odor differs according to the material in which it is contained, and, also, the amount of offensive odor sensed by human beings differs according to the kind of offensive odor. An offensive odor in an amount as small as less than one ten-thousandths of 1 p.p.m. is, in some cases, sensed by human beings.

As typical examples of the material containing malodorous components, mention may be made of fish cakes, fish entrails, animal intestines, soybean cakes after extraction of amino acids, and the like but these materials contain a large amount of water, so, when they are utilized as feedstuff or fertilizer, they must be processed to remove the water contained therein. Also, the droppings excreted from cattle, pigs, chickens and the like are presently utilized as fertilizer by drying with a dryer, but because conventional dryers are unfit for the purpose of deodorization, it is unavoidable that the offensive odor they emit drifts in the air in that vicinity.

In conventional machines of this type, materials containing malodorous components are odorlessly dried by the steps of heating said materials directly, mixing the evaporated malodorous components and water vapor with a combustion waste gas and burning up the resulting gaseous mixture by an after-burner again, but, in the gaseous mixture containing malodorous components, large amounts of carbonic acid gas, nitrogen gas and vapor are contained at the time of burning, so, when said gaseous mixture is burnt up by an after-burner, a large amount of oxygen must be fed. Accordingly, despite the malodorous components contained in the gaseous mixture being extremely small in amount a burner of high heating value, a large combustion chamber, a large amount of oxygen, and the like are required for burning and decomposing said malodorous components in this incombustible gaseous mixture completely; this is uneconomical in addition to having low efficiency.

A primary object of this invention is to provide a method and apparatus, free from the defects mentioned above, for odorlessly drying materials containing malodorous components easily and completely in a short time.

According to this invention, materials containing malodorous components are odorlessly dried by the steps of heating said materials indirectly, mixing the evaporating malodorous components and water vapor with air, removing the water from the resulting gaseous mixture, containing oxygen sufficiently, guiding the mixture to a heating burner and burning it up in admixture with heavy oil. In this method, the gaseous mixture containing malodorous components is burnt by one burner, and, by the heat generated, the feed materials containing malodorous components are heated, so it is very economical, and, also, it is possible to dry said materials continuously in an inodorous state.

Other objects and characteristic features of this invention will become apparent from the following complete description given on the basis of the accompanying drawing, wherein.

Figure 1:
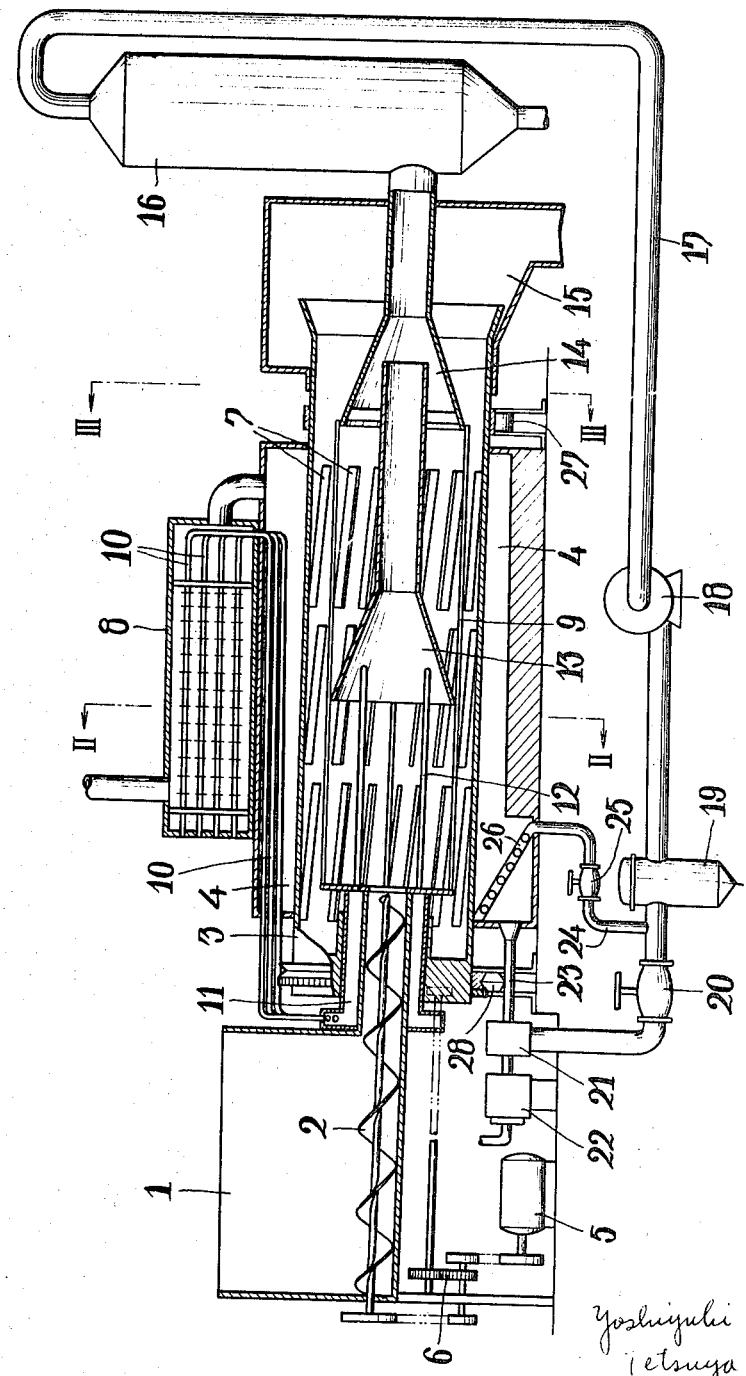
FIG. 1 is a front view, longitudinally sectioned, of an apparatus showing one embodiment of this invention.
Figure 2:
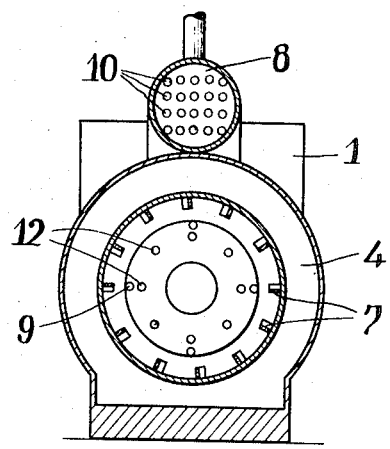
FIG. 2 is a sectional view taken along line II—II of FIG. 1.
Figure 3:
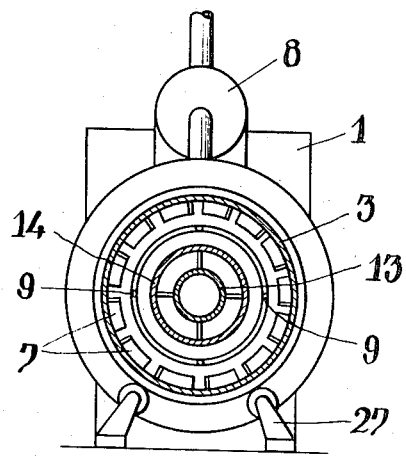
FIG. 3 is a sectional view taken along line III—III of FIG. 1.

Referring to the drawing, the material containing malodorous components fed into a bucket 1 is conveyed by a screw conveyor 2 to a drying drum 3. This drying drum 3 is disposed in a heating chamber 4 and supported by bearings 27 and 28, said drum being rotated by a motor 5 through a transmission mechanism 6 and being heated from its outer circumference by the heat in said heating chamber. The rotational frequency of said drum may be adjusted to from 3 to 16 times per minute according to the amount of water contained in the feed material.

To the inner wall of the drying drum 3, a plurality of plates 7 having a fixed height are fixed at a fixed angle to the axial direction of said drum and mutually at regular intervals; by said plates, the material fed into the drum 3 is lifted up as the drum rotates. If the material to be dried is, for example, fresh chicken droppings, then, because of the water contained therein, the material sometimes adheres in the form of a thick layer to the inner wall of the drum. In such cases, it is difficult to dry the material completely in a short time, and, therefore, in order to insure that the amount of the material to be lifted up by the plates 7 does not exceed the fixed amount, scraper bars 9 are provided in the axial direction of the drum 3 at a fixed distance from the inner wall of said drum so as to scrape off any material adhering beyond the fixed thickness.

Also, in the drying drum 3, the fresh air heated by both a heat exchanger 8, which is provided at the end portion of a flue for the combustion gas in the heating chamber 4, and heated pipes 10, which pass through said heating chamber, are discharged along the outer circumference 11 of the screw conveyor 2 and then through pipes 12 to the back of a collector 13. That is, at the inlet side of the drum, because of the initial stage of drying, the water contained in the material is evaporated in a large amount, so, unless fresh dry air is replenished from the outside, the vapor gets into a saturated state and, in consequence, the evaporation of the water is suppressed. This phenomenon is more striking when the heating temperature is lower. In order to eliminate such defect, the drying drum 3 is provided inside with collectors 13 and 14, the former in front of the latter. The water vapor and malodorous components evaporated at the initial stage of the drying of the material are collected in large amounts by the collector 13, and the relatively water-free material at and near the center of the drum is brought into contact with the heated fresh air discharged from the back of the collector 13, to accelerate the evaporation of the water in said material.

Thus, the material fed into the drying drum is dried, while evaporating the water and malodorous components, by the heating from the outer circumference of the drum as well as by the heated fresh air introduced into the drum, then conveyed to the outlet side of the drum by the rotation of the drum and the plates fixed to the inner wall of said drum, and discharged to the outside by a belt (not shown) from a hopper 15. Incidentally, the outlet side of the drum is inclined so as to become somewhat lower than the inlet side, and, therefore, the material is conveyed more effectively to the outlet side.

The air containing the evaporated malodorous components and water vapor is collected by the collectors 13 and 14 and sent to a cooling tower 16, wherein said air is cooled to remove the water and water-soluble malodorous components contained therein. The resulting air is passed through a pipe 17, a blower 18, a strainer 19 and a valve 20 into a heating burner 23, wherein said air, as primary air for said heating burner, is vigorously mixed by a blowing rotor 21 with heavy oil forced into said blowing rotor by motor 22, then jetted from said burner and burnt. That is, the air containing malodorous components is used as air for combustion by the heating burner, and, therefore, it is desirable, for burning and decomposing the malodorous components completely, to remove the water in said air as much as possible.

Also, when the air containing malodorous components is obtained in a large amount from the cooling tower, a part thereof is sent through a pipe 24 and a valve 25 into a nozzle 26 provided in front of the heating burner 23, and burnt up by said burner.

Thus, this invention is capable of odorlessly drying materials containing malodorous components easily and completely.

EXAMPLE

Fresh chicken droppings containing about 65% of water were fed into a drying drum rotating at 4.5 r.p.m. by a screw conveyor rotating at 5.8 r.p.m. at a rate of 230 kg./h, said drum being heated to about 350° C. at the outer circumference near the material inlet thereof, and, on the other hand, air heated to about 235° C. was introduced into said drum. The chicken droppings were heated by the heat of said heated drum and air to evaporate the malodorous components and water contained therein.

The air containing the evaporated components and water was cooled in a cooling column to remove the water. The temperature of the resulting air containing said malodorous components was about 35° C.

Said air was then used as air for a heating burner, any excess of air being jetted from a nozzle provided in front of said burner and burnt and decomposed completely. The results were as shown in Table 1.

TABLE 1

| Average temperature drying drum (° C.) | Amount of air introduced into drying drum (m.³/fresh chicken dropping kg./min.) | Before treatment | | After treatment | |
|---|---|---|---|---|---|
| | | Ammonia content at outlet of drying drum (mg./mg.²) | Iodine consumption at outlet of drying drum (mg./m.²) | Ammonia content in combustion water gas (mg./m.²) | Iodine consumption in combustion waste gas (mg./m.²) |
| 230 | 1.5 | 817 | 38.7 | 0 | 0 |
| 235 | 1.7 | 783 | 32.6 | 0 | 0 |
| 220 | 1.0 | 921 | 41.5 | 0 | 0 |

In the above table, the degree of odor is shown by the amounts of ammonia and hydrogen sulfide contained as the principal ingredients of the malodorous components. Tests were also made by the olfactory sense of human beings, but there was no offensive odor in the chicken droppings treated.

What is claimed is:

1. A method for odorlessly drying materials containing malodorous components which comprises feeding said materials into a heated rotating drying drum disposed in a heating chamber, introducing heated air into said drum, evaporating the malodorous components and water from said materials by the heat of said heated drum and air, conveying the resulting deodorized and dried materials to the outside of said drum by a plurality of plates provided on the inner wall of said drum, cooling the air containing said evaporated malodorous components and water to remove the water, and burning and decomposing the resulting air containing said malodorous components alone or in admixture with burner fuel by a burner.

2. A method as claimed in claim 1, wherein the plates provided on the inner wall of the drying drum have a fixed height and are disposed at a fixed angle to the axial direction of said drum.

3. A method as claimed in claim 1, wherein the burner heats the heating chamber.

4. An apparatus for odorlessly drying materials containing malodorous components which comprises a heating chamber, a heated rotary drying drum disposed in said heating chamber, means for feeding said materials into said drum, means for heating and introducing air into said drum, collectors for collecting the malodorous components and water evaporated from said materials by the heat of said heated drum and air, means for conveying the deodorized and dried materials to the outside of said drum, a cooling column for cooling said evaporated malodorous components and water collected by said collectors to remove the water, and a burner for burning and decomposing the air containing said malodorous components, said burner being disposed at the lower end of the material inlet side of said heating chamber.

5. An apparatus as claimed in claim 4, wherein the means for conveying the dried materials to the outside of the drying drum comprises a plurality of plates provided on the inner wall of said drum, said plates having a fixed height and being disposed at a fixed angle to the axial direction of said drum.

References Cited

UNITED STATES PATENTS

| | | | |
|---|---|---|---|
| 533,898 | 2/1895 | Holthaus | 34—86X |
| 1,176,813 | 3/1916 | Bromet et al. | 34—85X |
| 2,171,535 | 9/1939 | Berg | 34—86 |
| 2,187,201 | 1/1940 | Hartley | 34—86 |

WILLIAM J. WYE, Primary Examiner

U.S. Cl. X.R.

34—40, 85, 86, 108, 236